United States Patent [19]

Berens et al.

[11] Patent Number: 4,820,752

[45] Date of Patent: Apr. 11, 1989

[54] PROCESS FOR INCORPORATING AN ADDITIVE INTO A POLYMER AND PRODUCT PRODUCED THEREBY

[76] Inventors: Alan R. Berens, 6376 Elmcrest Dr., Hudson, Ohio 44236; Gary S. Huvard, 1085 Karen Dr.; Richard W. Korsmeyer, 1257 Weathervane La., both of Akron, Ohio 44313

[21] Appl. No.: 63,034

[22] Filed: Jun. 17, 1987

Related U.S. Application Data

[63] Continuation of Ser. No. 882,802, Jul. 7, 1986, abandoned, which is a continuation-in-part of Ser. No. 789,671, Oct. 21, 1985, abandoned.

[51] Int. Cl.$^4$ .................................. C08K 3/18
[52] U.S. Cl. ...................... 523/340; 424/78; 424/81; 424/83; 523/122
[58] Field of Search ............ 523/340, 347, 342, 122; 524/424, 567; 424/78, 81, 83

[56] References Cited

U.S. PATENT DOCUMENTS

4,598,006 7/1986 Sand ........................................ 424/81

Primary Examiner—Theodore E. Pertilla
Attorney, Agent, or Firm—Daniel J. Hudak; James R. Lindsay

[57] ABSTRACT

A process is described for infusing an additive into a polymer using a compressed fluid that is normally a gas at room temperature and pressure. The additive must have some degree of solubility in the compressed fluid and the solution of compressed fluid and additive must have some degree of solubility in the polymer. In accordance with the process, the solution of the normally gaseous fluid and additive and the polymer are brought into contact under pressure until a desired quantity of the solution is absorbed into the polymer. The compressed fluid then is diffused from the polymer leaving additive infused within the polymer. The process can be used, for example, to add a colorant to a polymer or to add a biocide, insect repellant, medication or other additives to a polymer for subsequent sustained release, or to introduce monomer and a polymerization initiator into a polymer for subsequent polymerization.

38 Claims, 3 Drawing Sheets

PROCESS FOR INCORPORATING AN ADDITIVE INTO A POLYMER AND PRODUCT PRODUCED THEREBY

This application is a continuation of application Ser. No. 06/882,802, filed July 7, 1986, now abandoned, which is a continuation-in-part of application Ser. No. 06/789,671, filed Oct. 21, 1985, now abandoned.

The present invention relates to the incorporation of an additive into a polymeric material without the utilization of mechanical mixing techniques.

Various compounding ingredients conventionally are added to rubber or plastic compositions to enhance the physical and/or chemical properties of the composition. Additives commonly added to rubber or plastic compositions include antioxidants, vulcanizing agents, accelerators, accelerator activators, plasticizers, softeners, tackifiers, and extenders. Typically, the additive or additives are combined with the rubber or plastic matrix by mixing the rubber or plastic and the additive or additives together on a roll mill, in an internal mixer (such as a Banbury mixer), or within an extruder. During the mixing process the rubber or plastic matrix is masticated to convert the rubber or plastic into a more pliable form. With many polymers, the mastication of the polymer per se generates sufficient heat to cause the temperature of the mix to rise substantially. The increased temperature of the polymer causes the mix to become more pliable and permits the compounding ingredients to be more easily dispersed throughout the polymer. With some polymers, however, external heat is necessary to impart to the polymer the desired degree of plasticity. However, the temperature rise of the composition achieved during the mechanical mixing process or because of externally applied heat can be detrimental to some polymers which degrade at temperatures realized during the mechanical mixing operation and to some additives which cannot withstand the temperatures reached during the mechanical mixing procedure. For example, when incorporating various additives into polyvinyl chloride (PVC), the PVC often is heated to temperatures of up to about 180° to 200° C. to cause the PVC to form a pliable plastic mass into which the additives readily can be included. At such temperatures, the PVC commences to rapidly degrade. Even certain additives which might be considered desirable for use in PVC compositions must not be used, since at the processing temperatures achieved they would decompose or be otherwise objectionably affected. Many potential additives for rubber compositions also would be adversely affected by the temperatures reached during mixing of the composition on roll mills or in an internal mixer or in an extruder. Some ultra-fast accelerators, if added to rubber batches being mixed on roll mills or in an internal mixer or in an extruder, would cause the rubber batch to "scorch" (pre-cure) during the mixing operation if the temperature of the rubber batch becomes too high. Therefore, it becomes apparent that a process for incorporating additives into polymers without subjecting the polymers or additives to the relatively high temperatures encountered during mechanical mixing procedures would be extremely useful. Solution (solvent) mixing or blending also can be used to combine a polymer with an additive. Solution mixing or blending involves dissolving the polymer and additive in a solvent to produce a solution. The solvent then is removed, leaving the polymer/additive blend as residue. However, complete removal of solvent from the polymer/additive blend is difficult, if not impossible, to accomplish. Since many solvents are toxic and even minute amounts of residual solvent in the resulting blend can be objectionable, solution mixing is not a suitable mixing procedure for preparing polymer/additive blends for use in certain applications.

SUMMARY OF THE INVENTION

The present invention provides a process whereby additives can be incorporated (infused) into polymers at temperatures significantly below temperatures normally encountered when compounding a rubber or plastic material using mechanical mixing procedures. In accordance with the present invention, an additive desired to be included in a rubber or plastic composition is dissolved in a compressed normally gaseous fluid. A "compressed normally gaseous fluid," as the term is used herein, is a fluid that is a gas at atmospheric pressure (14.7 psia, 101.3 kPa) and room temperature (22° C.) and that has a density (at the processing pressure) of at least 0.01 gram per cubic centimeter (g/cc), although a density of at least 0.1 g/cc is more preferred. The fluid may be in a liquid or gaseous state if the operating environment at which the process is being carried out is below or equal to the critical temperature of the fluid, or it may be in the gaseous or supercritical fluid state if the temperature of the fluid is above the critical temperature of the fluid. The fluid and additive are chosen so that the additive has a degree of solubility in the polymer into which it is to be infused and so that the solution of fluid and additive has a degree of solubility in the polymer and is capable of swelling the polymer. The solution of compressed normally gaseous fluid and additive is brought into intimate contact with the polymer for a time sufficient to permit the solution to be absorbed into the polymer. In the presence of the compressed normally gaseous fluid, the additive is absorbed into the polymer at a rate much faster than the additive would be absorbed if it alone were brought into contact with the polymer at the same temperature and pressure conditions. After the desired quantity of solution has been absorbed into the polymer, the fluid solvent is removed from the polymer. The removal from the polymer of the fluid (that has been at a pressure sufficient to maintain the fluid at a density of at least 0.01 g/cc) will cause the polymer to de-swell, entrapping additive within the polymer structure. It is known that the rate of diffusion from a polymer of a fluid contained within the polymer decreases with increasing molecular size of the fluid, other conditions being the same. The fluids used in the practice of the present invention are smaller in molecular size than common organic solvents for the polymer and common additives for the polymer. Consequently, the normally gaseous fluid will diffuse out of the polymer, if the pressure is reduced, more rapidly than common organic solvents or additives for the polymer.

Gaseous fluids have been used for a number of years for extracting ingredients from compositions or for separating one material from another.

U.S. Pat. No. 3,969,196 describes the separation of one organic compound from another using a supercritical fluid. In practicing the process, a supercritical fluid is placed in contact with a mixture of liquids and/or solids during which period one of the components in the mixture is dissolved in the supercritical fluid. The dissolved component is removed from the supercritical fluid by reducing the pressure of the supercritical fluid "solvent."

U.S. Pat. No. 4,061,566 describes removing organic adsorbates which have been entrapped by a polymeric adsorbent using a supercritical fluid as an inert solvent for the adsorbate. The spent polymeric adsorbent, with the adsorbate adhered to it, is exposed to a supercritical fluid that is a solvent for the adsorbate to cause the adsorbate to become dissolved in the supercritical fluid stream, thereby rejuvenating the adsorbent and rendering it capable of adsorbing more adsorbate. The adsorbate dissolved in the supercritical fluid is separated from the supercritical fluid solvent by reducing the temperature and/or pressure of the supercritical fluid (to change the fluid from being a solvent for the adsorbate to being a non-solvent for the adsorbate) or by reacting the adsorbate with another material added to the supercritical fluid to form a compound readily separated from the fluid.

U.S. Pat. No. 4,250,331 pertains to an extraction process for recovering organic carboxylic acids from aqueous solutions of salts of the carboxylic acids. In utilizing the process, the aqueous solution is contacted with carbon dioxide in a supercritical state. The carbon dioxide reacts with the salt of the organic carboxylic acid in the solution to produce carboxylic acid which dissolves in the supercritical fluid. The supercritical fluid phase is separated from the aqueous phase. The pressure of the supercritical fluid is reduced which significantly reduces the solvent capabilities of the carbon dioxide, resulting in the carboxylic acid separating from the carbon dioxide. The carboxylic acid is removed from the carbon dioxide which can be re-pressurized and re-used.

A process for recovering tall oil and turpentine or their components is described in U.S. Pat. No. 4,308,200. The process involves contacting wood chips to be extracted with a fluid at supercritical conditions, the fluid being selected so that at supercritical conditions the fluid is a solvent for the components in the wood desired to be extracted. The supercritical fluid is maintained in contact with the wood chips until the desired degree of extraction is achieved. The tall oil and turpentine are retrieved from the supercritical fluid by reduction of the pressure of the fluid phase. By step-down reduction of the pressure, the various components of the tall oil and turpentine can be retrieved as separate fractions.

In addition to the extraction processes mentioned above, supercritical fluid extraction has been used for:
 Removal of caffeine from coffee and tea;
 Removal of nicotine from tobacco;
 Deodorization of oils and fats;
 Removal of vegetable oils and fats from seeds;
 Deasphalting petroleum fractions;
 Removal of lanolin from wool;
 Oil removal from potato chips;
 Removal of monomer from polymer;
 Removal of α-acids from hops;
 Extraction of flavors and fragrances from lilac, lemon peel, black pepper, almonds, nutmeg, ground chilies, etc.; and
 Extraction of oils, such as triglycerides, from soybean flake and corn germ.

The aforesaid uses of supercritical fluids all concern extraction of a component from a matrix.

U.S. Pat. No. 4,112,151 describes a process for filling the pores of a resilient open-cell porous material with a pressure expressible material. The process can be used for filling the interconnecting cells of a resilient microporous rubber ink pad with ink. The process involves soaking the open-cell resilient material in a mixture of (a) a volatile solvent swelling agent for the resilient polymer and (b) the pressure expressible material. The volatile solvent swelling agent swells the polymer material enlarging the interconnecting pores (cells) of the microporous material. The solvent/ink mixture then is able to enter into and fill the enlarged pores (cells) of the microporous material. The volatile swelling agent then is allowed to evaporate from the microporous material leaving the pressure expressible material contained within the open cells of the microporous polymer.

DETAILED DESCRIPTION OF THE INVENTION

The process of this invention is based upon the use of a compressed normally gaseous fluid for introducing (infusing) one or more additives into a polymeric material. As used herein, the term "normally gaseous fluid" refers to a fluid whose boiling point at atmospheric pressure (14.7 psia, 101.3 kPa) is below room temperature (22° C.). Such normally gaseous fluids are useful in the process of this invention if they are compressed to a density of at least 0.01 gram per cubic centimeter (g/cc), preferably to a density of at least 0.1 g/cc. It is known that all fluids possess a critical temperature ($T_c$), above which a gaseous fluid cannot be converted to a liquid regardless of the pressure exerted on the gaseous fluid. In general, the solvent power of a given fluid increases as the density of the gaseous fluid increases. A fluid may have sufficient solvent or swelling power to be useful in practicing this invention if sufficiently compressed at temperatures above, equal to, or below the critical temperature of the fluid. Above the critical temperature of a fluid, the fluid would be used in its supercritical or gaseous state. At or below the critical temperature of a fluid, the fluid may be liquid or gaseous. The additive to be infused into a polymer must have some solubility in the compressed normally gaseous fluid being used. Further, the solution of compressed normally gaseous fluid and additive must have some degree of solubility in the polymer being infused and must be capable of swelling the polymer.

The polymer into which an additive is to be infused using the process of the present invention may be any rubber or plastic polymer capable of being swollen, desirably swollen at least 2 percent by volume, and preferably 5 percent by volume, by the compressed normally gaseous fluid to be used. Such polymers include natural rubbers, polyisoprene polymers, styrene-butadiene polymers, butyl rubbers, chloroprene polymers, polyamides, polyimides, polyesters, nitrile rubbers, polyacrylic polymers, polystyrene polymers, vinyl chloride polymers, vinylidene chloride polymers, polycarbonate polymers, polyurethane polymers, polyacetylenes and polyolefins.

The additives which may be infused into a particular polymer must have some degree of solubility in the swollen polymer, at least 0.1 percent by weight being desirable, and normally will be solid or liquid. Such additives include antioxidants, accelerators, accelerator activators, plasticizers, softeners, vulcanizing agents, extenders, tackifiers, monomers, polymerization initiators, UV stabilizers, UV sensitizers, dyes (colorants), bioactive chemicals, electronic dopants, optical dopants, etc. In fact, any liquid or solid material that has some degree of solubility in the polymer and has a molecular size sufficiently small to allow it to be absorbed into the swollen polymer may be infused into a polymer by the process of this invention provided that it also has some solubility in the compressed normally gaseous fluid being used.

The compressed normally gaseous fluid solvent used for the infusion may be any material that is gaseous at room temperature (22° C.) and atmospheric pressure (14.7 psia, 101.3 kPa) and that can dissolve the additive and cause the polymer to swell when the fluid is compressed to a density of at least 0.01 g/cc. Suitable fluid solvents include ethylene, carbon dioxide, ethane, nitrous oxide, monochlorotrifluoromethane, acetylene, phosphine, phosphonium chloride, methyl fluoride, methane, hydrogen chloride, fluoroform and sulphur dioxide. Carbon dioxide is a preferred fluid solvent for use in the present invention, since it is relatively inexpensive, non-toxic, and readily available.

Since the process of the present invention, as stated above, involves absorbing a solution of the compressed normally gaseous fluid solvent and additive into the polymer, the additive to be infused into the polymer must have some solubility in the fluid solvent and the solution of fluid solvent and additive must have some degree of solubility in the polymer.

In the practice of the process, the compressed normally gaseous fluid is maintained in contact with the additive to be infused into the polymer until additive dissolves in the fluid. The polymer can be in any convenient form depending upon the ultimate use of the polymer. Thus, the polymer may be in the form of sheets, films or molded or extruded shapes or may be in particulate form. The polymer may be confined in a pressure vessel into which the additive and the fluid solvent are added. The fluid solvent is compressed to a density of at least 0.01 g/cc, preferably to a density of at least 0.1 g/cc, either before or after being introduced into the pressure vessel. As indicated above, the temperature at which the infusion is conducted desirably is below a temperature that is objectionably detrimental to either the polymer or the additive. If the infusion is being carried out at a temperature at or below the critical temperature of the fluid solvent, the infusion process desirably is carried out at a pressure that is at least 10% of the saturated vapor pressure of the fluid solvent at the infusion temperature. If the infusion is being carried out at a temperature above the critical temperature of the fluid solvent, the infusion process desirably is carried out at a pressure 0.5 to 5 times the critical pressure of the fluid solvent. The solution of fluid solvent and additive is maintained in contact with the polymer for a period sufficient to permit the polymer to become swollen and for a period sufficient to permit a desired amount of the fluid solvent-additive solution to become dissolved within the polymer. The fluid solvent then is separated from the polymer leaving additive entrapped within the polymer. Removal of the fluid solvent from the polymer can be accomplished by high pressure centrifuge separation, by filtration, or merely by venting the pressure vessel to reduce the pressure within the pressure vessel (desirably to a pressure below the pressure that is 50% of the saturated vapor pressure of the fluid at the temperature of the fluid within the pressure vessel, but preferably to a pressure below the pressure that is 10% of the saturated vapor pressure and more preferably to ambient pressure). Reduction of the pressure within the pressure vessel causes the fluid solvent to diffuse from the polymer, thereby trapping the slower-diffusing additive within the polymer. Depending upon the nature of the additive infused into the polymer, the additive may diffuse slowly from the polymer or may for all practical purposes remain permanently entrapped within the polymer. The depressurized fluid solvent can be collected and re-used.

The process of the present invention is illustrated by the following examples:

EXAMPLE I

Vinyl chloride polymer composition chips* 1 cm×2 cm and of various thicknesses ($12.7 \times 10^{-3}$ cm, $25.4 \times 10^{-3}$ cm, $63.50 \times 10^{-3}$ cm and $127.0 \times 10^{-3}$ cm thick) were pre-weighed. Sample chips of the various thicknesses were exposed in a pressure vessel to carbon dioxide at room temperature (22° C.) and a pressure of $59.6 \times 10^5$ pascals for 65 hours; other sample chips were exposed in a pressure vessel to carbon dioxide in the presence of solid naphthalene at room temperature and a pressure of $59.6 \times 10^5$ pascals for 92 hours; and still other sample chips were exposed to solid naphthalene alone at its saturated vapor pressure for 114 hours. The samples were weighed immediately (within 2 minutes) after removal from the pressure vessel to determine the percent of weight gain exhibited by each sample. The samples were reweighed periodically to determine the amount of the weight gain remaining after the samples had been exposed to room temperature and pressure over the various periods of time. Table I gives the weight of absorbed material in the samples, expressed as percent of the polymer sample weight, after 2 minutes and after 24 hours.

*100 parts by weight of Geon® 103EP vinyl chloride polymer produced by The B. F. Goodrich Company, mill-mixed at 199° C. with 3 parts by weight of tin thioglycolate (stabilizer) and compression molded into samples at 199° C.

TABLE I

| | Sample Thickness (cms) | | | |
|---|---|---|---|---|
| | $12.7 \times 10^{-3}$ | $25.4 \times 10^{-3}$ | $63.5 \times 10^{-3}$ | $127.0 \times 10^{-3}$ |
| | Weight Increase Over Original Weight (%) | | | |
| Naphthalene alone | | | | |
| (2 minutes) | 0 | 0 | 0 | 0 |
| (24 hours) | 0 | 0 | 0 | 0 |
| Carbon dioxide alone | | | | |
| (2 minutes) | 6.5 | 7.6 | 8.3 | 5.9 |

TABLE I-continued

| | Sample Thickness (cms) | | | |
|---|---|---|---|---|
| | $12.7 \times 10^{-3}$ | $25.4 \times 10^{-3}$ | $63.5 \times 10^{-3}$ | $127.0 \times 10^{-3}$ |
| | Weight Increase Over Original Weight (%) | | | |
| (24 hours) | 0.2 | 0.8 | 3.1 | 2.9 |
| Carbon dioxide & Naphthalene | | | | |
| (2 minutes) | 18.2 | 21.3 | 21.6 | 15.2 |
| (24 hours) | 12.1 | 12.9 | 13.3 | 9.6 |

The results illustrate that naphthalene by itself is not absorbed into the vinyl chloride polymer chips, that carbon dioxide alone is absorbed to the extent of about 6 to 8% under the test conditions, but largely escapes from the polymer within 24 hours, and that in the presence of carbon dioxide naphthalene dissolves in the carbon dioxide, is absorbed into the vinyl chloride polymer and is largely retained in the samples after the carbon dioxide has escaped from the samples.

EXAMPLE II

Figure 1:
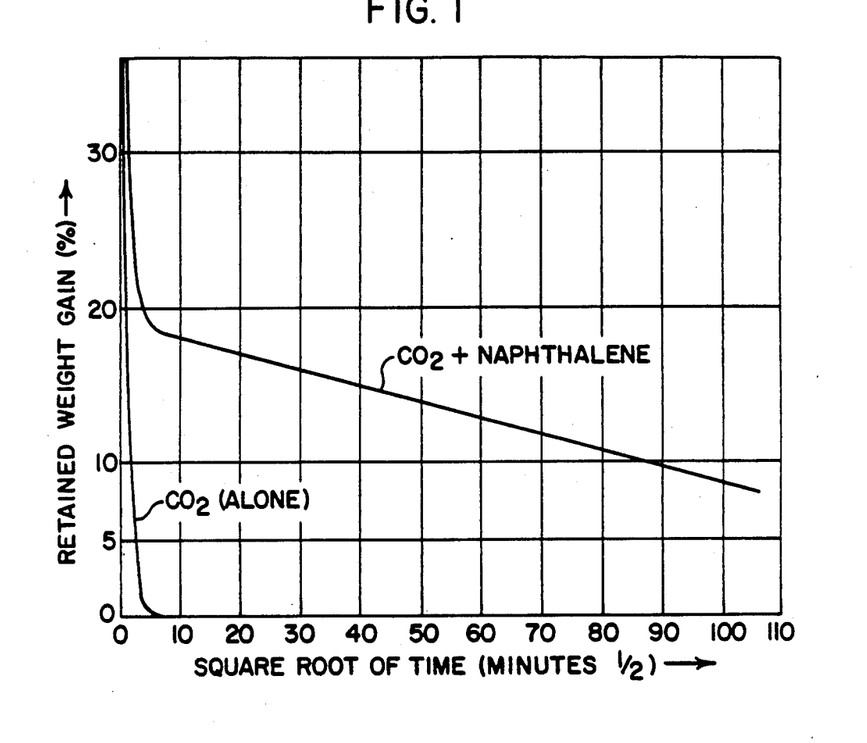
FIG. 1 are graphs illustrating the results of the experimentation described in Example II.

Weighed samples (approximately one gram) of vinyl chloride polymer powder (Geon® 103EP resin manufactured by The B. F. Goodrich Company) were exposed in a vessel to carbon dioxide at room temperature and a pressure of $62.05 \times 10^5$ pascals for 96 hours. Additional weighed samples of the vinyl chloride polymer powder were exposed to a mixture of carbon dioxide and solid naphthalene at room temperature and a pressure of $59.6 \times 10^5$ pascals for 92 hours. The samples were weighed immediately after the period of exposure was completed and at intervals thereafter to determine the percent of weight gain exhibited by each sample over a period of time. The weight gains retained by the samples were plotted against time (plotted as minutes). The results are shown in FIG. 1 of the drawings.

The graphs indicate that all of the carbon dioxide absorbed by the samples was desorbed from the samples within about ½ hour after removal of the sample from the pressure vessel and that the naphthalene diffuses slowly from the vinyl chloride polymer sample over a much longer period of time.

EXAMPLE III

Sample chips 1 cm $\times$ 2 cm $\times 12.7 \times 10^{-3}$ cm were formed from a vinyl chloride polymer composition (PVC)[1], a polystyrene polymer (PS)[2], a methylmethacrylate polymer (PMMA)[3], and a polycarbonate polymer (PC)[4]. Sample chips of each polymer were placed in an atmosphere of carbon dioxide for one hour at room temperature and a pressure of $65.1 \times 10^5$ pascals. Other sample chips of each polymer were placed in contact with various additives at ambient temperature and pressure for one hour. Still other sample chips of each polymer were placed in contact with the same additives for one hour at room temperature but in an atmosphere of carbon dioxide at $65.1 \times 10^5$ pascals. The sample chips were weighed before being exposed to the carbon dioxide and/or additives. Immediately after the one-hour exposure time the samples were blotted to remove any liquid adsorbed on the surfaces of the chips and were weighed within 1 minute. The samples were weighed again at 24 hours after the one-hour exposure time, in order to determine the weight gain of the sample chips. The results of the tests are set forth in Table II.

[1]100 parts by weight of Geon® 103EP vinyl chloride polymer and 3 parts by weight of tin thioglycolate (stabilizer).
[2]Huntsman PS-203 obtained from E. Helman Company, Montrose, Ohio, Catalog No. R3057.
[3]Clear acrylic polymer (PMMA) obtained from E. Helman Company, Catalog No. R3341.
[4]Polycarbonate M39F produced by Mobay Chemical Company.

TABLE II

| | Samples | | | |
|---|---|---|---|---|
| | PVC | PS | PMMA | PC |
| | Weight Gain (%) | | | |
| Carbon Dioxide: | | | | |
| (no additive) | | | | |
| (1 min) | 6.8 | 7.0 | 16.0 | 10.7 |
| (24 hrs) | 0.2 | 0.4 | 0.6 | 0.1 |
| Additive | | | | |
| Naphthalene: | | | | |
| Alone | 0.2 | 0.6 | 0.5 | 0.3 |
| With CO$_2$ | | | | |
| (1 min) | 20.9 | 29.6 | 27.8 | 21.5 |
| (24 hrs) | 11.8 | 18.0 | 12.5 | 12.1 |
| Xylene: | | | | |
| Alone | 1.0 | — | — | 74.0 |
| With CO$_2$ | | | | |
| (1 min) | 17.6 | — | — | 42.7* |
| (24 hrs) | 9.9 | — | — | 5.4 |
| 1-Hexanol: | | | | |
| Alone | 1.5 | 0.1 | 0.5 | 1.0 |
| With CO$_2$ | | | | |
| (1 min) | 7.1 | 5.3 | 71.2 | 7.2 |
| (24 hrs) | 0.5 | 1.2 | 24.3 | 0.9 |
| Ethyl laurate: | | | | |
| Alone | 0.5 | 35.6 | 1.3 | 1.3 |
| With CO$_2$ | | | | |
| (1 min) | 6.1 | 6.6* | 28.4 | 5.5 |
| (24 hrs) | 0.4 | 0.3 | 7.0 | 0 |
| Ethyl Benzoate: | | | | |
| Alone | 7.7 | — | — | ? |
| With CO$_2$ | | | | |
| (1 min) | 33.3 | — | — | 34.2 |
| (24 hrs) | 18.0 | — | — | 6.2 |
| Dimethyl Phthalate: | | | | |
| Alone | 0.6 | — | 1.04 | — |
| With CO$_2$ | | | | |
| (1 min) | 49.9 | 66.0 | — | 109.0 |
| (24 hrs) | 33.3 | 53.0 | — | 73.2 |

The additive in certain instances dissolved or disintegrated the sample so that no test results were available. In some instances (marked with an asterisk), the carbon dioxide reduced the swelling of the polymer.

Appreciable carbon dioxide was absorbed by all polymer samples, but had diffused out of the samples almost completely within the 24-hour test period. The weight gains remaining after the 24-hour test period, thus, indicate essentially the weight of additives infused.

EXAMPLE IV

Figure 2:
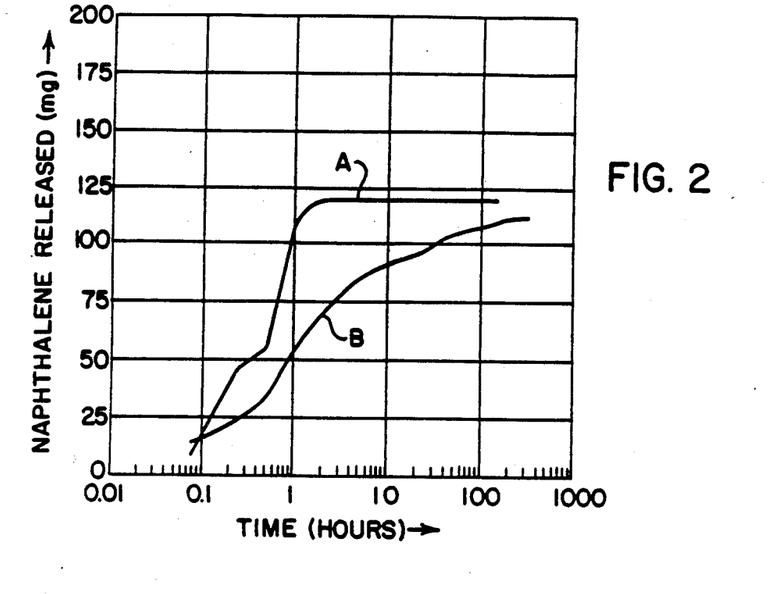
FIG. 2 are graphs illustrating the results of the experimentation described in Example IV.

A 10-gram sample (Sample A) of a vinyl chloride polymer powder (Geon® 103EP resin) was hand-mixed with 2 grams of powdered naphthalene at room temperature (22° C.). A second 10-gram sample (Sample B) of the vinyl chloride polymer powder also was hand-mixed with 2 grams of powdered napthalene at room temperature, but then was immersed in liquid carbon dioxide for one hour at a pressure of $65.1 \times 10^5$ pascals. A one-gram specimen of Sample A was placed in a jar containing 100 ml of a 50/50 ethanol-water solvent solution. A one-gram specimen of Sample B was placed in a second jar containing 100 ml of a 50/50 ethanol-water solvent solution. The contents of each jar was stirred. The solvent solution was periodically removed by rapid filtration and was replaced by fresh washes of 100 ml of the solvent solution per jar. The filtrate solvent solutions were analyzed by UV spectroscopy for naphthalene content. The amounts (in milligrams) of naphthalene released into the solvent solution washes as a function of time the sample had been immersed in the solvent solution were determined and plotted. The results are shown in FIG. 2.

The graphs illustrate that the naphthalene in the one-gram specimen of Sample A was essentially completely removed from the specimen by the solvent solution within about one hour, whereas naphthalene was still being removed from the one-gram specimen of Sample B after more than 300 hours of being washed with the solvent solution. The results indicate that naphthalene had been infused into the vinyl chloride polymer powder of Sample B as a result of the treatment with $CO_2$, as contrasted to the mere mechanical mixture of vinyl chloride polymer powder and naphthalene in Sample A.

EXAMPLE V

Figure 3:
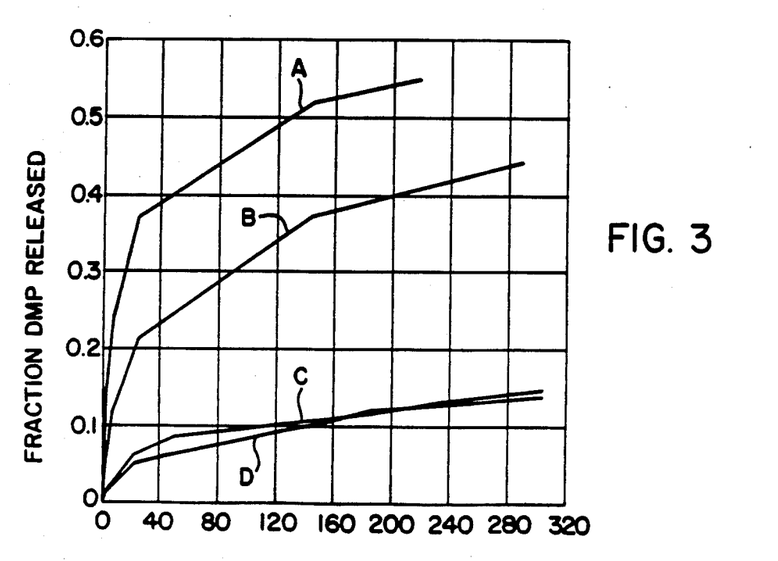
FIG. 3 are graphs illustrating the results of the experimentation described in Example V.

Four weighed samples of vinyl chloride polymer film* 1 cm×2 cm and of various thicknesses (Sample A was 0.013 cm thick, Sample B was 0.025 cm thick, Sample C was 0.064 cm thick and Sample D was 0.130 cm thick) were treated with a solution of dimethyl phthalate (DMP) and liquid carbon dioxide for 16 hours at a pressure of $65.1 \times 10^5$ pascals. The pressure then was reduced to atmospheric pressure. After a 16 hour desorption period at atmospheric pressure, the samples were weighed to determine the amount of dimethyl phthalate infused into the polymer samples. Sample D contained 18% by weight of dimethyl phthalate. Samples A, B and C each contained approximately 40% by weight of dimethyl phthalate. Each sample was immersed separately in 50 ml of distilled water which was periodically changed. The water washes were analyzed by UV spectroscopy for dimethyl phthalate content. The amount by weight of dimethyl phthalate diffused from the sample, expressed as the fraction of the total dimethyl phthalate infused into the sample, was plotted against the aggregate time the sample was immersed in the water wash. The results are shown in FIG. 3.

The graphs illustrate the rates at which the dimethyl phthalate that had been infused into each sample diffuses from the sample and show that release of dimethyl phthalate continues for at least 200 hours.

*100 parts by weight of Geon® 103 EP vinyl chloride polymer mill-mixed with 3 parts by weight of tin thioglycolate (stabilizer) at 199° C. and calendered into a film at 199° C.

EXAMPLE VI

Figure 4:
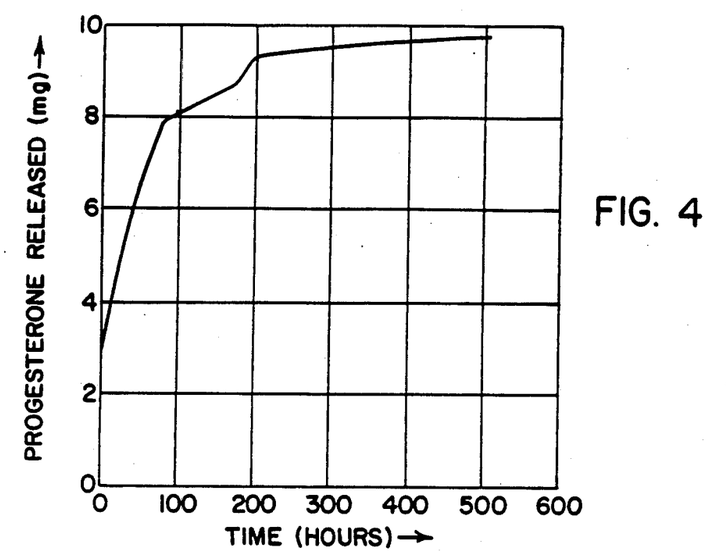
FIG. 4 is a graph illustrating the results of the experimentation described in Example VI.

A 7.3 cm×7.3 cm sample of polyurethane (Estane 5714, sold by The B. F. Goodrich Company) sheet 0.029 cm thick was exposed to progesterone in the presence of carbon dioxide at a temperature of 45° C. and a pressure of $151.6 \times 10^5$ pascals for 4½ hours. The carbon dioxide was allowed to diffuse from the sample at ambient temperature and pressure for one hour. At the end of the one hour diffusion period 99% of the carbon dioxide had diffused from the sample (as determined by weight loss measurement). The sample contained 8% by weight progesterone. A one gram piece of the treated sheet was immersed in 100 ml of a 75/25 ethanol-water solvent solution and the contents stirred. The solvent solution wash was changed periodically. The amount by weight of progesterone that had diffused into the solvent solution wash was determined by UV spectophotometry. The aggregate amounts of progesterone released over the aggregate time of washing with solvent solution was plotted. The results are shown in FIG. 4.

The graph illustrates the diffusion pattern of the progesterone from the polyurethane film over a period of time, the diffusion of progesterone from the polyurethane sheet occurring mostly during the first 200 hours and continuing for at least 500 hours.

EXAMPLE VII

Figure 5:
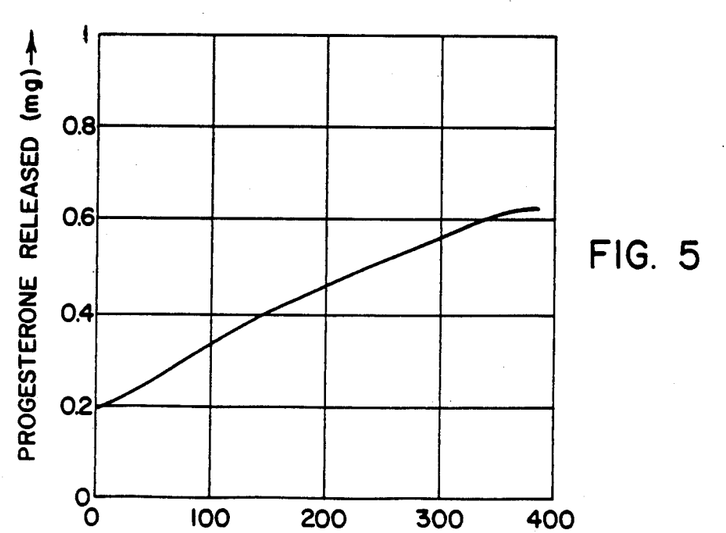
FIG. 5 is a graph illustrating the results of the experimentation described in Example VII.

A 15.24 cm×10.16 cm×0.014 cm sample of a polycarbonate (Polymer M-39F) was exposed to progesterone in the presence of carbon dioxide at room temperature (22° C.) and a pressure of $59.6 \times 10^5$ pascals for 66 hours. After allowing the absorbed carbon dioxide to diffuse from the sample at ambient temperature and pressure, the sample contained about 0.5% by weight of progesterone. A one gram piece of the treated film was washed with 100 ml of 75/25 ethanol-water solvent as described in Example VI. The amount by weight of progesterone that had diffused into each solvent wash was determined by UV spectophotometry. The aggregate amounts of progesterone released over the aggregate time of washing with solvent solution was plotted. The results are shown in FIG. 5.

The graph illustrates that the progesterone was released into the solvent solution at a fairly constant rate of release for over 350 hours.

EXAMPLE VIII

Three separate 1 cm×2 cm×0.013 cm chips were formed from a vinyl chloride polymer composition (PVC)[1], from a polycarbonate (PC)[2] and from a polyurethane (PU)[3]. One set of chips of each of the compositions was exposed to 26 grams of trifluoromethane in a 106 ml pressure vessel at room temperature and a pressure of $44.8 \times 10^5$ pascals for a period of 17 hours. A second set of chips of each of the compositions was exposed for 17 hours at ambient temperature and pressure to benzophenone by covering the chips with benzophenone powder. The third set of chips of each of the compositions was exposed for 17 hours to 26 grams of trifluoromethane and 2 grams of benzophenone powder in a 106 ml pressure vessel at room temperature and a pressure of $44.8 \times 10^5$ pascals. All of the chips were weighed before exposure to the trifluoromethane and/or benzophenone, immediately (within 1 to 3 minutes) after the chips were removed from the exposure vessel, and again at 8 hours or 24 hours or 72 hours after their removal from the exposure vessel. Retained weight gains, expressed as percent of original sample weight, were determined. The results are listed in Table III.

TABLE III

| Samples | RETAINED WEIGHT GAIN (%) | | |
|---|---|---|---|
| | PVC | PC | PU |
| Additive | | | |
| Trifluoromethane: | | | |
| (1 minute) | 1.0 | 6.5 | 5.3 |

TABLE III-continued

| Samples | RETAINED WEIGHT GAIN (%) | | |
|---|---|---|---|
| | PVC | PC | PU |
| (24 hours) | 0.3 | 0.7 | 0 |
| Benzophenone: | | | |
| (2 minutes) | 0.3 | 0.4 | 10.2 |
| (8 hours) | 0 | 0 | 10.0 |
| Trifluoromethane plus benzophenone: | | | |
| (3 minutes) | 5.5 | 25.3 | 61.0 |
| (72 hours) | 3.3 | 17.9 | 53.6 |

[1] Same PVC composition as used in Example III.
[2] Same PC composition as used in Example III.
[3] Same PU composition as used in Example VI.

With respect to each polymer, the retained weight gain was greater for chips exposed to the combination of trifluoromethane and benzophenone, as compared to chips exposed to either trifluoromethane or benzophenone alone, indicating that the trifluoromethane (which is a gas at ambient temperature and pressure, has a boiling point of $-82°$ C. a critical temperature of $25.19°$ C. and a critical pressure of about $48.33 \times 10^5$ pascals) promoted the infusion of benzophenone into the polymers.

EXAMPLE IX

Sample chips 1 cm $\times$ 2 cm $\times$ 0.0127 cm were formed from a vinyl chloride polymer composition*. One chip was exposed for 17 hours in a 106 ml pressure vessel at room temperature (22° C.) and at a pressure of $3.45 \times 10^5$ pascals to 16 grams of liquid sulfur dioxide. A second chip was exposed for 17 hours in a 106 ml of pressure vessel at room temperature and at a pressure of $3.4 \times 10^5$ pascals to 16 grams of liquid sulfur dioxide and 2 grams of naphthalene dissolved in the $SO_2$. A third chip was exposed for 17 hours in a 106 ml pressure vessel at room temperature and a pressure of $3.45 \times 10^5$ pascals to 16 grams of liquid sulfur dioxide and 2 grams of benzophenone dissolved in the $SO_2$. The chips were weighed before being exposed as described above and immediately (within 2 minutes) after venting and opening the pressure vessel. The chips were allowed to stand at ambient temperature and pressure for 24 hours after being removed from the pressure vessel and again were weighed. The retained weight gains of the samples (expressed as a percent weight gain over the weight of the chip before exposure) were determined. The results of the evaluation are given in Table IV.

TABLE IV

| Additive | Retained Weight Gain (%) |
|---|---|
| Sulfur dioxide (alone): | |
| (2 minutes) | 31.4 |
| (24 hours) | 2.4 |
| Sulfur dioxide and naphthalene: | |
| (2 minutes) | 37.6 |
| (24 hours) | 17.3 |
| Sulfur dioxide and benzophenone: | |
| (2 minutes) | 27.5 |
| (24 hours) | 11.5 |

*Same composition described in Example I.

The results illustrate that the PVC is appreciably swollen by the liquid $SO_2$, but that the $SO_2$ has largely diffused from the PVC after the 24 hour desorption period. The results further indicate that the $SO_2$ enhanced the infusion of naphthalene and benzophenone into the PVC polymer.

EXAMPLE X

Four preweighed sample chips 1 cm $\times$ 2 cm were cut from a rigid polyvinyl chloride polymer (PVC) film that was 0.0127 cm thick and were immersed in dimethyl phthalate (DMP) within pressure vessels. Three of the sample chips (Sample B, Sample C and Sample D) were exposed to compressed carbon dioxide ($CO_2$) gas at various pressures for 17 hours at ambient temperature (23° C.). The fourth sample chip (Sample A) was allowed to remain immersed in the dimethyl phthalate for 24 hours at room temperature. After Samples B, C and D had been thus immersed for the 17-hour soak period, the pressure within the pressure vessels was released and the sample chips were removed from the dimethyl phthalate. After the 24-hour soak period, Sample A was removed from the dimethyl phthalate. The sample chips were allowed to stand for 24 hours and then were weighed to determine the weight percent increase of the chips (which weight increase represents the weight of dimethyl phthalate absorbed by the sample chips). The test results are given in Table V.

TABLE V

| Sample | $CO_2$ Pressure (pascals) | Exposure Time (hrs.) | DMP Absorbed Wt. Percent |
|---|---|---|---|
| A | 0 | 24 | 0.8 |
| B | $7.9 \times 10^5$ | 17 | 1.6 |
| C | $15.8 \times 10^5$ | 17 | 12.2 |
| D | $23.7 \times 10^5$ | 17 | 75.1 |

EXAMPLE XI

Two preweighed sample sheets were cut from a 0.0114 cm thick sheet of a polycarbonate polymer (Polymer M-39F) and were separately weighed. One sample (Sample A) was soaked in poly(ethylene glycol 400) diacrylate (PEG 400 DA) in a pressure vessel in the presence of $CO_2$ at $65.9 \times 10^5$ pascals for 2 hours at 25° C. The pressure vessel was vented to the atmosphere. The sample (Sample A) was removed from the pressure vessel and allowed to degas for 20 hours. The sample (Sample A) was weighed and was found to have absorbed 24.8 parts by weight of the poly(ethylene glycol 400) diacrylate per 100 parts by weight of the polycarbonate polymer. The second sample (Sample B) of polycarbonate sheet was soaked in pure poly(ethylene glycol 400) diacrylate (PEG 400 DA) for 1 hour and was found to have absorbed only 1.0 part by weight of the poly(ethylene glycol 400) diacrylate per 100 parts by weight of the polycarbonate polymer.

EXAMPLE XII

Two samples of equal size (each weighing approximately 0.363 gram) were cut from a 19.2 mil thick sheet of a polycarbonate polymer (Polymer M-39F). One sample (Sample A) was soaked in 5.0 grams of poly(ethylene glycol 400) diacrylate (PEG 400 DA) and 0.05 gram of 4,4'-dichlorobenzophenone in a pressure vessel in the presence of 52 grams of $CO_2$ at $65.9 \times 10^5$ pascals for 2 hours. The pressure within the pressure vessel was reduced to ambient pressure. The sample (Sample A) was removed from the pressure vessel and allowed to degas in the atmosphere for 20 hours. The degassed sample was weighed and found to have a weight increase of 19.3 percent. The degassed sample was irradiated with UV radiation for 5 hours. Infrared analysis indicated that the irradiated sample (Sample A)

had 25 percent less unsaturation than the second sample (Sample B) that had been similarly treated except that it (Sample B) had not been exposed to the UV radiation step.

Example XII illustrates the infusion of a monomer and photo-sensitizer into the polycarbonate polymer and the subsequent polymerization of the infused poly-(ethylene glycol 400) diacrylate with the preformed sheet of polycarbonate polymer.

The process of the present invention can be used in a variety of ways. For example, the process can be used to add a colorant to a polymer or to add a biocide, insect repellant, medication or other additives to a polymer for subsequent sustained release, and to introduce monomer and a polymerization initiator into a polymer for subsequent polymerization. Various other uses for the process will be apparent.

We claim:

1. A process for infusing into a rubber or plastic polymeric material a normally solid or liquid additive that has a degree of solubility in said polymeric material when said polymeric material is in a swollen state which process comprises:
   (a) dissolving said additive in a compressed normally gaseous fluid solvent that has a boiling point when measured at atmospheric pressure (14.7 psia, 101.3 kPa) below room temperature (22° C.) to form a solution, said compressed fluid solvent having a density of at least 0.01 g/cc and said solution of said compressed fluid solvent and said additive being soluble in said polymeric material and being capable of swelling said polymeric material;
   (b) contacting said solution of said compressed normally gaseous fluid solvent and said additive with said polymeric material for a time sufficient to allow at least a part of said solution to be absorbed by said polymeric material; and
   (c) separating at least essentially all of said fluid solvent from said polymeric material leaving additive infused within said polymeric material.

2. The process of claim 1 wherein said fluid solvent is separated from said polymeric material by reducing the pressure maintained on said solution absorbed within said polymeric material causing said fluid to diffuse from said polymeric material.

3. The process of claim 2 wherein said pressure is reduced to a pressure below the pressure that is 10% of the saturated vapor pressure of said fluid solvent at the temperature of said fluid solvent.

4. The process of claim 2 wherein said pressure is reduced to ambient pressure.

5. The process of claim 1 wherein said solution is maintained at a temperature below a temperature which is objectionably detrimental to said polymeric material or said additive.

6. The process of claim 5 wherein said solution is maintained at a pressure that is at least 50% of the saturated vapor pressure of the said fluid solvent at the temperature of infusion when the temperature of infusion is at or below the critical temperature of said fluid solvent and at a pressure 0.5 to 5 times the critical pressure of said fluid solvent when the temperature of infusion is above the critical temperature of said fluid solvent.

7. The process of claim 6 wherein said fluid solvent is separated from said polymeric material by reducing the pressure maintained on said solution absorbed within said polymeric material causing said fluid to diffuse from said polymeric material.

8. The process of claim 7 wherein said pressure is reduced to a pressure below the pressure that is 50% of the saturated vapor pressure of said fluid solvent at the temperature of said fluid solvent.

9. The process of claim 7 wherein said pressure is reduced to ambient pressure.

10. The process of claim 1 wherein said fluid solvent is carbon dioxide.

11. The process of claim 1 wherein said additive is comprised of at least two components, one of which is a monomer and the other of which is a polymerization initiator.

12. The polymeric product derived from the infusion into a rubber or plastic polymeric material of a normally solid or liquid additive that has a degree of solubility in said polymeric material when said polymeric material is in a swollen state which infusion is obtained by:
   (a) dissolving said additive in a compressed normally gaseous fluid solvent which has a boiling point measured at atmospheric pressure (14.7 psia, 101.3 kPa) below room temperature (22° C.) and which is compressed to a density of at least 0.01 g/cc to form a solution, said solution of said fluid solvent and said additive being soluble in said polymeric material and being capable of swelling said polymeric material;
   (b) contacting said solution of said compressed fluid solvent and said additive with said polymeric materials for a time sufficient to allow at least a part of said solution to be absorbed by said polymeric material; and
   (c) separating at least essentially all of said fluid solvent from said polymeric material leaving additive infused within said polymeric material.

13. The polymeric product derived from the process of claim 2.

14. The polymeric product derived from the process of claim 3.

15. The polymeric product derived from the process of claim 4.

16. The polymeric product derived from the process of claim 5.

17. The polymeric product derived from the process of claim 6.

18. The polymeric product derived from the process of claim 7.

19. The polymeric product derived from the process of claim 8.

20. The polymeric product derived from the process of claim 9.

21. The process of claim 1 wherein said polymeric material is rubber or plastic polymer capable of being swollen at least 2 percent by volume by said compressed normally gaseous fluid solvent.

22. The process of claim 1 wherein the solubility of said additive in said polymeric material is at least 0.1 percent.

23. The polymeric product derived from the process of claim 21.

24. The polymeric product derived from the process of claim 22.

25. The process of claims 1, 2, 3, 4, 5, 6, 7, 8, 9, 10, 11, 21, or 22 in which said fluid solvent has a density of at least 0.1 g/cc.

26. The polymeric product derived from the process of claim 1 in which said fluid solvent has a density of at least 0.1 g/cc.

27. The polymeric product derived from the process of claim 2 in which said fluid solvent has a density of at least 0.1 g/cc.

28. The polymeric product derived from the process of claim 3 in which said fluid solvent has a density of at least 0.1 g/cc.

29. The polymeric product derived from the process of claim 4 in which said fluid solvent has a density of at least 0.1 g/cc.

30. The polymeric product derived from the process of claim 5 in which said fluid solvent has a density of at least 0.1 g/cc.

31. The polymeric product derived from the process of claim 6 in which said fluid solvent has a density of at least 0.1 g/cc.

32. The polymeric product derived from the process of claim 7 in which said fluid solvent has a density of at least 0.1 g/cc.

33. The polymeric product derived from the process of claim 8 in which said fluid solvent has a density of at least 0.1 g/cc.

34. The polymeric product derived from the process of claim 9 in which said fluid solvent has a density of at least 0.1 g/cc.

35. The polymeric product derived from the process of claim 10 in which said fluid solvent has a density of at least 0.1 g/cc.

36. The polymeric product derived from the process of claim 11 in which said fluid solvent has a density of at least 0.1 g/cc.

37. The polymeric product derived from the process of claim 21 in which said fluid solvent has a density of at least 0.1 g/cc.

38. The polymeric product derived from the process of claim 22 in which said fluid solvent has a density of at least 0.1 g/cc.

* * * * *